(12) United States Patent
Mory

(10) Patent No.: US 6,349,114 B1
(45) Date of Patent: Feb. 19, 2002

(54) CAMERA MOTION PARAMETERS ESTIMATION METHOD

(75) Inventor: Benoît Mory, Paris (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/478,474

(22) Filed: Jan. 6, 2000

(30) Foreign Application Priority Data

Jan. 12, 1999 (EP) .............................................. 99400065

(51) Int. Cl.[7] .............................. H04B 1/66; H04N 1/18; H04N 9/47
(52) U.S. Cl. .................... 375/240.21; 348/144; 348/145
(58) Field of Search ........................ 375/240.01, 240.12, 375/240.15, 240.16, 240.21; 348/150, 151, 152, 144, 145, 208, 154, 104, 317, 320; 382/41, 42; 250/332, 370.08, 318; H04B 1/66

(56) References Cited

PUBLICATIONS

"Qualitative Estimation of Camera Motion Parameters From Video Sequqnces", By M.V. Srinivasan Et Al, Pattern Recognition, vol. 30, No. 4, 1997, pp. 593–605.

Srinivasan M.V. Et Al: "Qualitative Estimation of Camera Motion Parameters From Video Sequences", Pattern Recognition, U.S. Pergamon Press Inc., Elmsford, N.Y., vol. 30, No. 4, Apr. 1, 1997 pp. 593–605.

Kim Et Al: "Efficient Linear Three–Dimensional Camera Motion Estimation Method With Applications to Video Coding", Optical Engineering U.S. Soc. of Photo–Optical Instrumentation Engineers, Bellingham, vol. 37, No. 3, Mar. 1, 1998, pp. 1065–1077.

Primary Examiner—Chris Kelley
Assistant Examiner—Tung T. Vo
(74) Attorney, Agent, or Firm—Russell Gross

(57) ABSTRACT

The invention relates to a method of estimation of the motion parameters of a camera. It is applied to a sequence of successive video frames subdivided into blocks and includes the following steps of extracting from the sequence vectors corresponding to the motion between two frames, motion vectors forming the camera velocity field, preprocessing the camera velocity field thus obtained, in order to reduce the amount of data and the heterogeneousness of the extracted motion vectors, estimating for each pair of frames, from the preprocessed field, camera features between the two considered frames, and undertaking, on the basis of said estimation, a long term motion analysis to obtain motion descriptors corresponding to the estimated camera motion parameters.

2 Claims, 5 Drawing Sheets

CAMERA MOTION PARAMETERS ESTIMATION METHOD

BACKGROUND OF THE INVENTION

The invention relates to a camera motion parameters estimation method, said parameters being intended to become descriptors in the MPEG-7 video indexing framework.

The invention relates to a camera motion parameters estimation method, said parameters being intended to become descriptors in the MPEG-7 video indexing framework.

The last decades have seen the development of large databases of information, accessible to many people. These databases are composed of several types of media such as text, images, sound, etc . . . The characterization, representation, indexing, storage, transmission and retrieval of such information constitute important issues in the usefulness of this technology. Whatever the level of sub-division at which video indexing can be contemplated, each information sub-division can be then indexed according to several criteria such as semantic information content, scene attributes, camera motion parameters, and so on. MPEG-7, also named "Multimedia Content Description Interface" and focussing on content-based retrieval problems, will standardize generic ways to describe such multimedia content, using descriptors and description schemes that would be associated to multimedia material, in order to allow fast and efficient retrieval based on various types of features, such as text, color, texture, motion and semantic content. This standard will address applications that can be either stored (on-line or off-line) or streamed (e.g. broadcast or video in the internet) and can operate in both real time and non-real time environments.

A schematic block diagram of a possible MPEG-7 processing chain, shown in FIG. 1 and provided for processing any multimedia content, includes at the coding side a feature extraction sub-assembly 11 operating on said content, a normative sub-assembly 12, including a module 121 for yielding the MPEG-7 definition language and a module 122 for defining the MPEG-7 descriptors and description schemes, a standard description sub-assembly 13, and a coding sub-assembly 14. The scope of the MPEG-7 standard is the sub-assembly 12, and the invention is located in the sub-assemblies 12 and 13. FIG. 1 also shows the decoding side, including a decoding sub-assembly 16 Oust after a transmission of the coded data, or a reading operation of these stored coded data), and a search engine 17 working in reply to the actions controlled by the user.

In the MPEG-7 framework, efficient tools must be developed for many subjects like scene analysis or motion analysis, and particularly methods for camera motion feature extraction. For a motion representation, two solutions can be proposed as a possible basis for global motion descriptors extraction: the perspective model, and the block matching method. The former is well suited for camera global motion, but cannot represent tridimensional translations, that have to be distinctly described each time it is possible.

Block matching motion compensation is used as a part of the predictive coding process that is widely used in video transmission for reducing the amount of information needed to encode a video sequence. Indeed, only a little fraction of an image changes from a frame to the following one, allowing a straightforward prediction from said previous frame. More precisely, each frame (i+1) is divided into a fixed number of blocks (usually square). For each block (typically of 8×8 pixels), a search is made for the most similar block in a previous reference frame (i), over a predetermined area. The search criterion is generally the search of the best matching block, giving the least prediction error, usually computed as the mean absolute difference (which is easier to compute than for instance the mean square difference). For each block (in the present example, of 8×8 pixels) located in (x,y), the predicted image (i+1) is then computed from image (i) according to the relation (1):

$$B(i+1)[x,y]=B(i)[x-dx, y-dy] \tag{1}$$

with $(dx, dy) = \vec{v}$ = motion vector leading from B(i), in the image (i), to B(i+1), in the image (i+1).

When starting from block matching motion vectors in order to estimate camera movements, the main problem is then that the efficiency of the estimator of these vectors is only measured in terms of a coding criterion. Motion vectors do not necessarily correspond to the real motion of the scene. For example, in an area of homogeneous texture in the scene, the estimator could choose any of the blocks inside the texture, even if the motion vector is not representative of the global motion. However, although block matching represents a motion that is not always consistent, this method will be preferred, because translations have to be distinctly described each time it is possible and the perspective model is not able to do it. Starting from motion vectors thus determined, some camera parameters will then be defined. Before describing the corresponding definition method, the camera model used in the present description is first presented.

A monocular camera moving through a static environment is considered. As can be seen in FIG. 2, let 0 be the optical centre of the camera and OXYZ an external coordinates system that is fixed with respect to the camera, OZ being the optical axis. Let $T_x$, $T_y$, $T_z$ be the translational velocity of OXYZ relative to the scene and $R_x$, $R_y$, $R_z$ its angular velocity. If (X,Y,Z) are the instantaneous coordinates of a point P in the tridimensional scene, the velocity components of P will be:

$$\overline{X} = -T_x - R_y \cdot Z + R_z \cdot Y \tag{2}$$

$$\overline{Y} = -T_y - R_z \cdot X + R_x \cdot Z \tag{3}$$

$$\overline{Z} = -T_z - R_x \cdot Y + R_y \cdot X \tag{4}$$

The image position of P, namely p, is given in the image plane by the relation (5):

$$(x,y) = \text{internal coordinates} = (f\, X/Z,\, f\, Y/Z) \tag{5}$$

(where f is the focal length of the camera), and will move across the image plane with an induced velocity:

$$(u_x, u_y) = (\overline{x}, \overline{y}) \tag{6}$$

After some computations and substitutions, the following relations are obtained:

$$u_x = f \cdot \frac{\overline{X}}{Z} - f \cdot \frac{X \cdot \overline{Z}}{Z^2} \tag{7}$$

$$u_x = \frac{f}{Z}(-T_x - R_y \cdot Z + R_z \cdot Y) - \frac{f \cdot X}{Z^2}(-T_z - R_x \cdot Y + R_y \cdot X) \tag{8}$$

and:

$$u_y = f \cdot \frac{Y}{Z} - f \cdot \frac{Y \cdot \overline{Z}}{Z^2} \qquad (9)$$

$$u_y = \frac{f}{Z}(-T_y - R_z \cdot X + R_x \cdot Z) - \frac{f \cdot Y}{Z^2}(-T_z - R_x \cdot Y + R_y \cdot X) \qquad (10)$$

which can also be written:

$$u_x(x,y) = -\frac{f}{Z} \cdot (T_x - x \cdot T_z) + \frac{x \cdot y}{f} \cdot R_x - f\left(1 + \frac{x^2}{f^2}\right)R_y + y \cdot R_z \qquad (11)$$

$$u_y(x,y) = -\frac{f}{Z} \cdot (T_y - y \cdot T_z) - \frac{x \cdot y}{f} \cdot R_y + f\left(1 + \frac{y^2}{f^2}\right)R_x + x \cdot R_z \qquad (12)$$

Moreover, in order to include the zoom in the camera model, it is assumed that a zoom can be approximated by a single magnification in the angular domain. Such an hypothesis is valid if the distance of the nearest object in the scene is large compared to the change of focal length used to produce the zoom, which is usually the case.

A pure zoom is considered in FIG. 3. Given a point located in the image plane, on (x,y) at a time t and on (x', y') at the next time t', the image velocity $u_x = x' - x$ along x induced by the zoom can be expressed as a function of $R_{zoom}$ ($R_{zoom}$ being defined by the relation $(\theta' - \theta)/\theta$, as indicated in FIG. 3), as shown below.

One has indeed: $\tan(\theta') = x'/f$ and $\tan(\theta) = x/f$, which leads to:

$$u_x = x' - x = [\tan(\theta') - \tan(\theta)] \cdot f \qquad (13)$$

The expression of $\tan(\theta')$ can be written:

$$\tan(\theta') = \tan[(\theta' - \theta) + \theta] = \frac{\tan(\theta' - \theta) + \tan(\theta)}{1 - \tan(\theta) \cdot \tan(\theta' - \theta)} \qquad (14)$$

Assuming then that the angular difference $(\theta'-\theta)$ is small, i.e. $\tan(\theta'-\theta)$ can be approximated by $(\theta'-\theta)$, and that $(\theta'-\theta).\tan\theta \ll 1$, one obtains:

$$u_x = x' - x = f \cdot \left[\frac{(\theta' - \theta) + \tan(\theta)}{1 - (\theta' - \theta) \cdot \tan\theta} - \tan\theta\right] \qquad (15)$$

$$u_x = f \cdot \frac{(\theta' - \theta) \cdot (1 + \tan^2(\theta))}{1 - (\theta' - \theta) \cdot \tan\theta} \qquad (16)$$

$$u_x = f \cdot \theta \cdot R_{ZOOM} \cdot \frac{1 + \tan^2(\theta)}{1 - (\theta' - \theta) \cdot \tan\theta} \qquad (17)$$

which is practically equivalent to:

$$u_x = x' - x = f \cdot \theta \cdot R_{zoom} \cdot (1 + \tan^2\theta) \qquad (18)$$

This result can be rewritten:

$$u_x = f \cdot \tan^{-1}\left(\frac{x}{f}\right) \cdot R_{ZOOM} \cdot \left(1 + \frac{x^2}{f^2}\right) \qquad (19)$$

and, similarly, $u_y$ is given by:

$$u_Y = f \cdot \tan^{-1}\left(\frac{y}{f}\right) \cdot R_{ZOOM} \cdot \left(1 + \frac{y^2}{f^2}\right) \qquad (20)$$

The velocity $u = (u_x, u_y)$ corresponds to the motion induced in the image plane by a single zoom. A general model in which all the rotations, translations (along X and Y axis) and zoom are taken into account can then logically be defined.

This general model can be written as the sum of a rotational velocity, representing rotational and zoom motions, and a translational velocity, representing the X and Y translations (i.e. tracking and booming respectively)

$$\begin{Bmatrix} u_x = u_x^{trans} + u_x^{rot} \\ u_y = u_y^{trans} + u_y^{rot} \end{Bmatrix} \qquad (21)$$

with:

$$\begin{Bmatrix} u_x^{trans} = -\frac{f}{Z} \cdot T_x \\ u_y^{trans} = -\frac{f}{Z} \cdot T_y \end{Bmatrix}$$

$$\begin{Bmatrix} u_x^{rot} = \frac{x \cdot y}{f} \cdot R_x - f \cdot \left(1 + \frac{x^2}{f^2}\right) \cdot R_y + y \cdot R_z + f \cdot \tan^{-1}\left(\frac{x}{f}\right) \cdot \left(1 + \frac{x^2}{f^2}\right) \cdot R_{zoom} \\ u_y^{rot} = \frac{x \cdot y}{f} \cdot R_y + f \cdot \left(1 + \frac{y^2}{f^2}\right) \cdot R_x - x \cdot R_z + f \cdot \tan^{-1}\left(\frac{y}{f}\right) \cdot \left(1 + \frac{y^2}{f^2}\right) \cdot R_{zoom} \end{Bmatrix}$$

equations in which only translational terms depend on the object distance Z.

The article "Qualitative estimation of camera motion parameters from video sequences", by M. V. Srinivasan and al., Pattern Recognition, vol.30, no.4, 1997, pp.593–605, describes for extracting camera motion parameters from a sequence of images a technique using the camera equations (21) to (23). More precisely, the basic principle of this technique is explained in part 3 (pp.595–597) of said article. The technique, implemented by finding the best values of $R_x$, $R_y$, $R_z$ and $R_{zoom}$ that create a flow field which, when subtracted from the original optic flow field, then results in a residual flow field wherein all the vectors are parallel, uses an iterative method minimizing deviations from parallelism of the residual flow vectors, by means of an advantageous sector-based criterion.

At each step of this iterative method, the optic flow due to the current camera motion parameters is calculated according to one of two different camera models. A first model assumes that the angular size of the visual field (or the focal length f) is known: this means that the ratios x/f and y/f in the equations (23) can be calculated for each point in the image, said equations then allowing to calculate the optic flow exactly.

A second model assumes that the visual field of the camera is not known. Small field approximations (x/f and y/f very lower than 1) are then necessary before applying the equation (23), which leads to the equations (24) and (25):

$$u_x^{rot} \square -f.R_y + y.R_z + x.R_{zoom} \quad (24)$$

$$u_y^{rot} \square -f.R_x - x.R_z + y.R_{zoom} \quad (25)$$

It appears that the first model, which is the one taking into account panning or tilting distorsions, produces more accurate results when the visual field of the camera is large and known. Unfortunately, the focal length is generally not known, which leads to use the second model, only on a restricted area of the image when the visual field is suspected to be large. However, this second model is not a satisfying solution since it is not possible to distinguish panning from tracking.

While horizontal and vertical trackings produce flow fields in which all vectors are truly parallel, this is not the case with pan and tilt unless the visual field of the camera is small, for instance: 20°×20° (large visual fields lead to distorsions in the velocity fields arising from the planar geometry of the imaging surface). The flow field produced by a zoom is also distorted (far away from the centre, motion vectors are no longer radially oriented). If the visual field is large, the resulting distorsions can be used to enable translational motions to be uniquely distinguished from pan and tilt.

SUMMARY OF THE INVENTION

It is therefore an object of the invention to improve the scheme for camera motion features estimation from motion vectors by proposing a camera motion parameters estimation method that is able, each time it is physically possible, to make the difference between tracking and panning and differently carry out them when the visual field is large, even if it is unknown, but without making this difference when the visual field is small.

It is therefore an object of the invention to improve the scheme for camera motion features estimation from motion vectors by proposing a camera motion parameters estimation method that is able, each time it is physically possible, to make the difference between tracking and panning and differently carry out them when the visual field is large, even if it is unknown, but without making this difference when the visual field is small.

To this end, the invention relates to an estimation method provided for considering a sequence of successive video frames subdivided into blocks and processing this sequence, wherein said processing operation comprises according to the successive steps of:

extracting from said video sequence vectors corresponding to the motion between two successive frames, said motion vectors forming the camera velocity field;

preprocessing the camera velocity field, in order to reduce the amount of data and the heterogeneousness of said extracted motion vectors;

estimating for each pair of frames, from said preprocessed field, camera features between the two considered frames;

undertaking on the basis of said estimation a long term motion analysis to obtain motion descriptors corresponding to the estimated camera motion parameters.

The main idea is that if a large visual field generates distorsions in the velocity field in most cases, the same distorsions should also be useful. In other words, if the focal length (or the visual field, which is the same information with an image size scale factor) is included in the minimization process that uses the first model hereinabove mentioned, it should be correctly estimated when the visual field is not too small and when there is actually one of the zoom, pan, tilt or roll motion components (which represents an important part of real cases; this focal length estimation would not be meaningful if the visual field is too small or if there is only a tracking motion).

BRIEF DESCRIPTION OF THE DRAWINGS

The present invention will now be described, by way of example, with reference to the accompanying drawings in which.

The present invention will now be described, by way of example, with reference to the accompanying drawings in which.

DETAILED DESCRIPTION OF THE PREFERRED EMBODIMENTS

Figure 4:
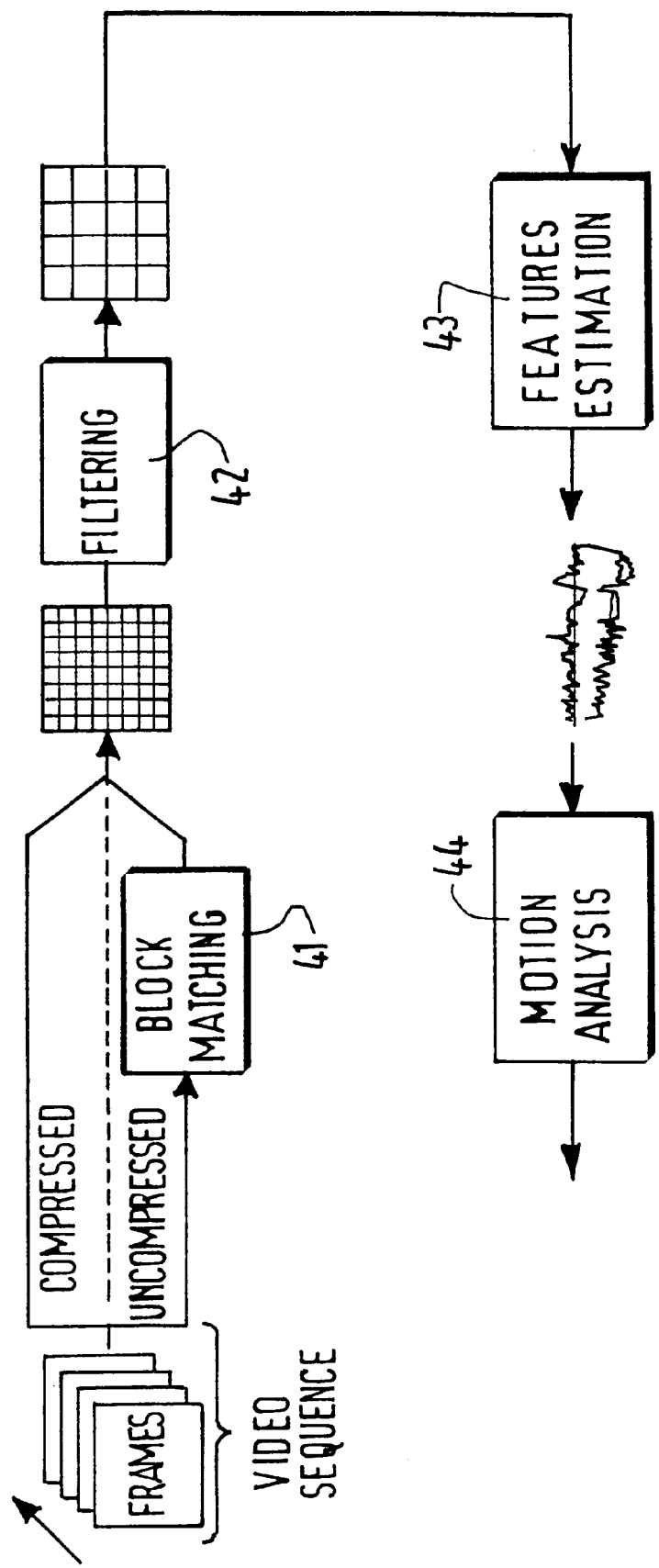
FIG. 4 gives an overview of a complete camera motion analysis system carrying out the estimation method according to the invention.

A complete scheme of an implementation of the estimation method according to the invention is illustrated in FIG. 4. It may be noted that, since MPEG-7 will be a multimedia content description standard, it does not specify a particular coding type. A process of descriptors formation must therefore work on all types of coded data (either compressed or uncompressed). Nevertheless, as most of the video data obtained from the input frames are generally available in the MPEG format, (there are therefore compressed), it is advantageous to use directly the motion vectors provided by the MPEG motion compensation. If the video data are available in the uncompressed domain, a block-matching method is therefore implemented in a motion vector generation device 41.

A complete scheme of an implementation of the estimation method according to the invention is illustrated in FIG. 4. It may be noted that, since MPEG-7 will be a multimedia content description standard, it does not specify a particular coding type. A process of descriptors formation must therefore work on all types of coded data (either compressed or uncompressed). Nevertheless, as most of the video data obtained from the input frames are generally available in the MPEG format, (there are therefore compressed), it is advantageous to use directly the motion vectors provided by the MPEG motion compensation. If the video data are available in the uncompressed domain, a block-matching method is therefore implemented in a motion vector generation device 41.

Whatever the case, once motion vectors have been read or extracted from the video sequence (between two successive frames), a downsampling and filtering device 42 is provided. The goal of the filtering of the velocity field is to reduce the amount of data and the heterogeneousness of the motion vectors. This operation is followed by an instantaneous estimation, in a device 43, of the camera features. This estimation is based on the method previously described, improved in order to use motion vectors and to include the focal length in the minimization process, and leads to one features vector for each pair of frames. The set of features vectors within the whole considered sequence is then finally received by a long-term motion analysis device 44 that outputs motion descriptors which may be used to index the sequence in terms of camera motion in a content-based retrieval context, especially in the MPEG-7 video indexing framework.

Two main problems justify the preprocessing step in the device 42: the heterogeneousness of the motion vectors, above all in the low-frequency parts of the image or where texture is very homogeneous, and the too small size of the blocks. The downsampling and filtering process is provided for reducing the amount of vectors by downsampling the original field and simultaneously rejecting the vectors that are not consistant according to the global information. A confidence mask, calculated for each vector, is used: it is a criterion varying between 0 and 1 according to the level of confidence of each motion vector and allowing to decide if the vectors are taken into account or not. An example of confidence mask may be to consider that for any theoretical camera motion, a motion vector cannot vary too much: close vectors have close values. One can then measure a confidence level according to the distance from each vector to its neighbourhood, which can be for instance represented by its average value or, preferably, its median (because it is less sensitive to big isolated errors). The confidence mask $C_{i,j}$ is therefore defined by the equation (26):

$$C_{i,j} = e^{-\|\vec{v}_{i,j} - \vec{v}_{median}\|^2} \quad (26)$$

Figure 1:
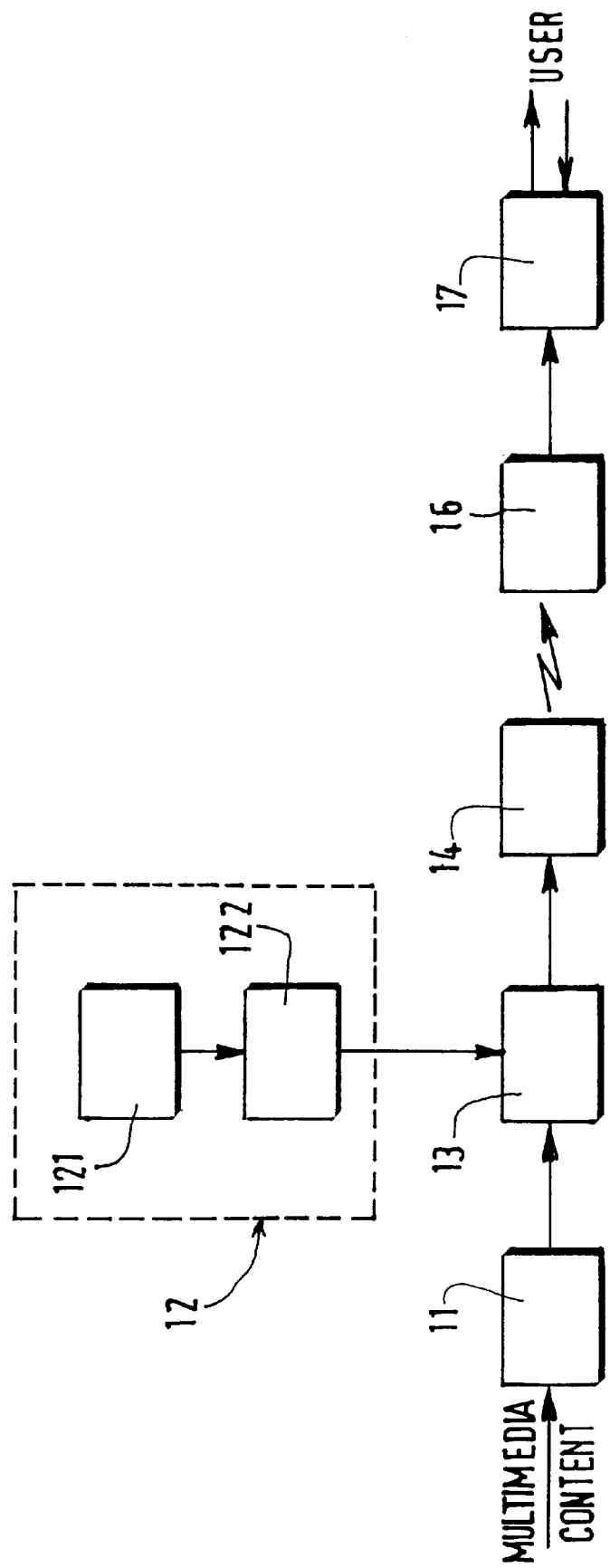
FIG. 1 is a schematic block diagram of a possible MPEG-7 processing chain.
Figure 2:
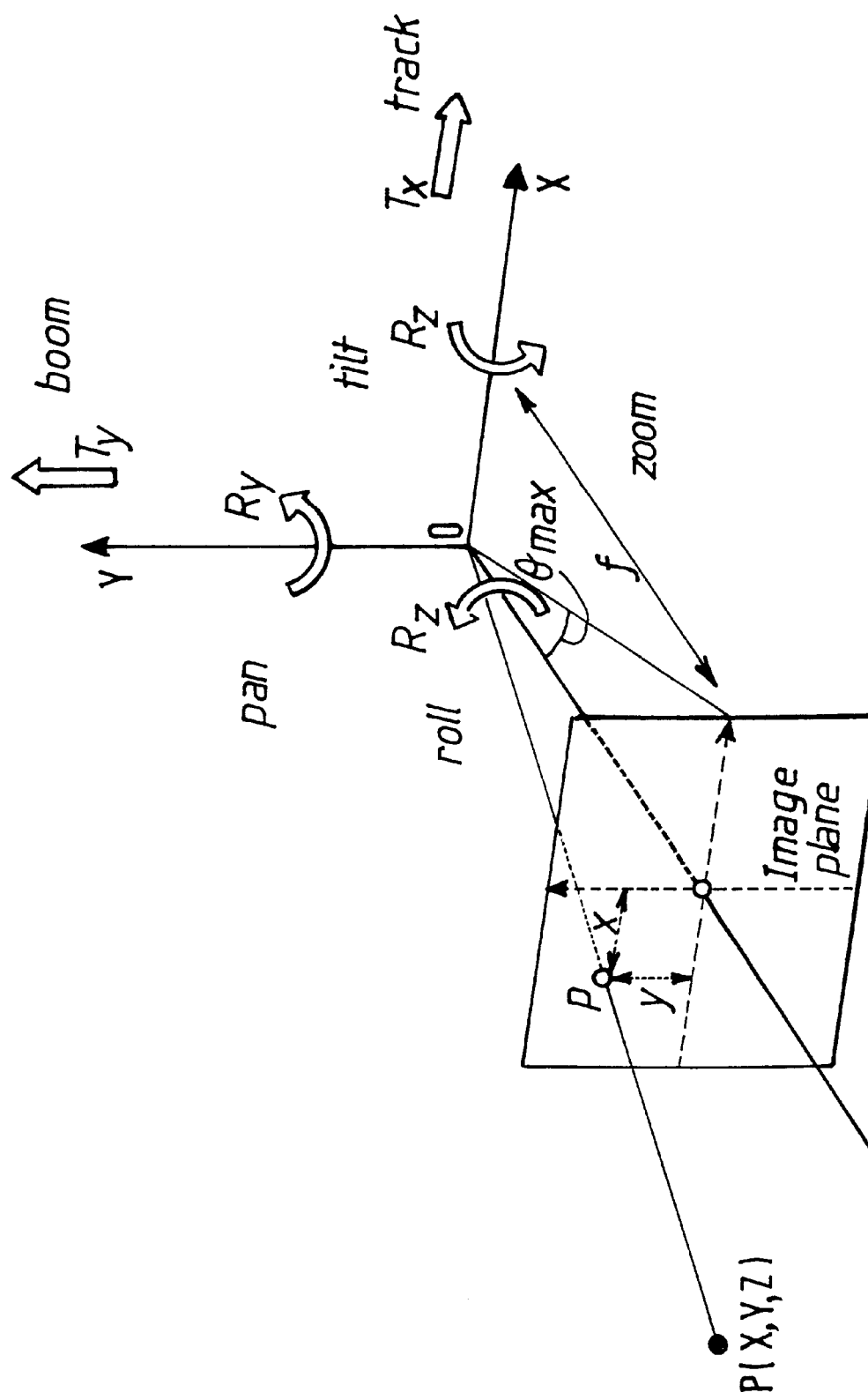
FIG. 2 illustrates for a camera an external coordinates system OXYZ moving with the camera and shows, for a focal length f, the retinal coordinates (x,y) corresponding to a point P in the tridimensional scene.
Figure 3:
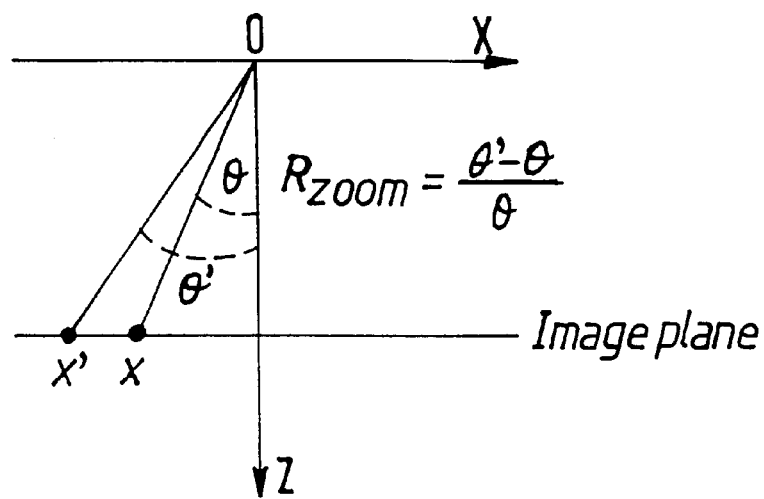
FIG. 3 illustrates a zoom model included in the camera model.
Figure 5:
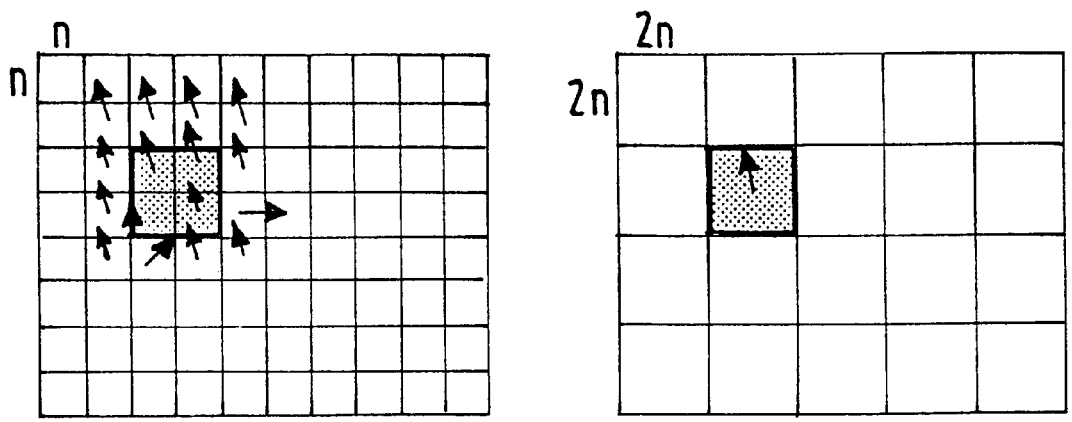
FIG. 5 illustrates the filtering technique used in the system according to the invention.

FIG. 5 illustrates the filtering technique: the filtered field (right side) contains four times as fewer blocks as the original field (left side). The vector representing the motion of a new block is computed according to the motion vectors of the four original blocks, and their confidence level is calculated according to the neighbourhood as indicated. The motion vector for the new block is the weighted mean of its old smaller blocks:

$$\vec{V}_{m,n}(filt) = \frac{\sum_{i=2(m-1)+1}^{2(m-1)+2} \sum_{j=2(n-1)+1}^{2(n-1)+2} C_{i,j} \cdot \vec{V}_{i,j}}{\sum_{i=2(m-1)+1}^{2(m-1)+2} \sum_{j=2(n-1)+1}^{2(n-1)+2}} \quad (27)$$

The device 43, provided for computing for each pair of frames, from the filtered motion vectors field, a feature vector that contains the camera motion information between the two considered frames, implements an estimation algorithm which is now detailed.

First, the confidence mask is computed, from the equation (26). Then the parallelisation process starts. Each time a motion vector is taken into account in the computation of the cost function or of the resultant vector, it is weighted by its confidence mask. The following equations then allow to compute the best values of $R_x$, $R_y$, $R_z$, $R_{zoom}$ and the focal length f that give a residual field in which all the vectors are parallel:

$$\vec{R}^{estim} = [\hat{R}_x, \hat{R}_y, \hat{R}_z, R_{zoom}, \hat{f}] = \arg\min\{P(\vec{R})\} \quad (28)$$

where $P(\vec{R}) = \sum_i \sum_j \|\vec{v}_{i,j}^{residual}(\vec{R})\|^2 \cdot \theta_{i,j} \cdot C_{i,j}$ (29)

with:

$$\vec{v}_{i,j}^{residual}(\vec{R}) = \vec{v}_{i,j} - \begin{bmatrix} u_x^{rot}(\vec{R}) \\ u_y^{rot}(\vec{R}) \end{bmatrix} \quad (30)$$

and $\theta_{i,j} = \text{angle}(\vec{v}_{i,j}^{residual}, \vec{V}^{residual})$, $$\vec{V}^{residual} = \frac{\sum_i \sum_j \vec{v}_{i,j}^{residual} \cdot C_{i,j}}{\sum_i \sum_j C_{i,j}} \quad (31)$$

In the case of a non-translational motion in a large visual field, the residual vectors would not be parallel but should ideally be close to zero. This remark leads to compute the β ratio given by the equation (32):

$$\beta = \frac{\left\|\sum \vec{v}_{i,j}^{residual}(\vec{R}^{estim})\right\|}{\sum \left\|\vec{v}_{i,j}^{residual}(\vec{R}^{estim})\right\|} \quad (32)$$

which indicates the parallelism of the residual field. This is the ratio of the magnitude of the resultant of the residual flow vectors to the sum of the magnitudes of the residual flow vectors: β=1 implies that the residual vectors are perfectly aligned, while β=0 implies that the residual vectors are randomly oriented with respect to each other. Moreover, to check the presence of a significant tracking component in the camera motion, the strength of the residual flow field is compared to that of the original flow field by computing the following ratio α, given by the equation (33):

$$\alpha = \frac{\text{mean}^{(*)}\left(\left\|\vec{v}_{i,j}^{residual}(\vec{R}^{estim})\right\|\right)}{\text{mean}^{(*)}(\|\vec{v}_{i,j}\|)} \quad (33)$$

The "mean(*)" operator represents the weighted mean of its arguments, according to the confidence mask. These two ratios allow to check for the presence and the amount of tracking components as shown below:
A) if β~0, no tracking motion;
B) if β~1:
 if α~0, negligible tracking motion;
 if α~1, significant tracking motion:
  $\hat{T}_x = -V_x^{residual}$
  $\hat{T}_y = -V_y^{residual}$
These ratios also give an idea of the results relevance.

It must be noted that the estimated components of translational motion, namely $\hat{T}_x$ and $\hat{T}_y$, do not represent exact components of the first model, but a weighted mean within the whole image of $$f \cdot \frac{T_x}{z} \text{ and } f \cdot \frac{T_y}{z},$$

since the depth of each block is not known. However, they are good representations of apparent tracking motion in the image.

For the parallelism cost function, the downhill simplex minimization algorithm has been chosen because it does not involve computation of the derivatives, which would be impossible here since the original field is part of the cost function. The downhill simplex method is a multidimensional method that requires only function evaluations, not derivatives, unlike many others methods like all the gradient-based ones. It is an essential point here since there is no analytical form of the cost function. A simplex is the geometrical figure consisting, in N dimensions, of N+1 points (or vertices) and all their interconnecting line segments, polygonal faces, etc . . . : in two dimensions, a simplex is a triangle, in three dimensions it is a tetrahedron, and so on. In general, only simplexes that are non degenerate (i.e. that enclose a finite n-dimensional volume) are considered. If any point of a simplex is taken as the origin, the other N points define vector directions that span the N-dimensional vector space. In one-dimensional minimization, it is possible to bracket a minimum (dichotomy) so that the success of isolation is guaranteed.

Figure 6:
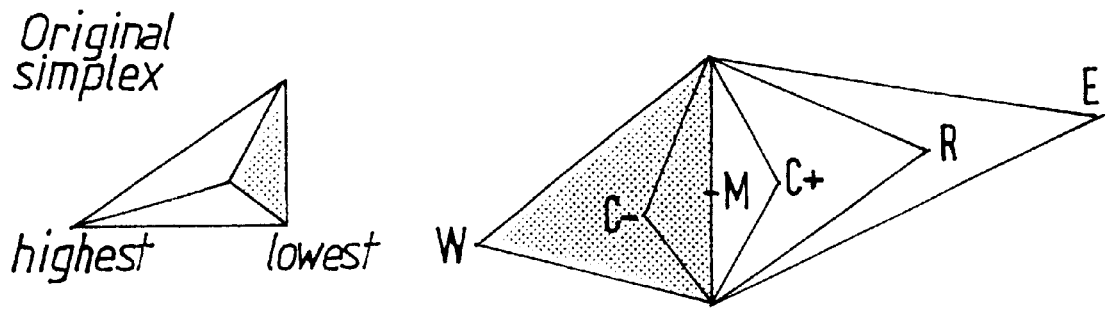
FIG. 6 illustrates how, when implementing the downhill simplex method, a new simplex is constructed.

Even if there is no analogous procedure in multidimensional space, the downhill simplex method is the one that best fits this idea. The algorithm starts with an N-vector of independent variables as the first point to try and is then supposed to make its own way downhill through the space until it encounters a minimum to enclose, at least a local one. The method must be started not just with a single point, but with N+1 points, defining an initial simplex. Then, at each step, a new simplex is constructed. As shown in FIG. 6 (left part) most steps move the point of the simplex where the function is largest ("highest point") through the opposite face of the simplex to a lower point (reflections). These kinds of steps conserve the volume of the simplex. The procedures for expansion and contraction enable the simplex method to accelerate along a successfull track of improvement and to home in on the optimum conditions. The algorithm stops when the required objectives are reached, practically when the decrease in the function value is fractionally smaller than some tolerance $\epsilon$.

Figure 7:
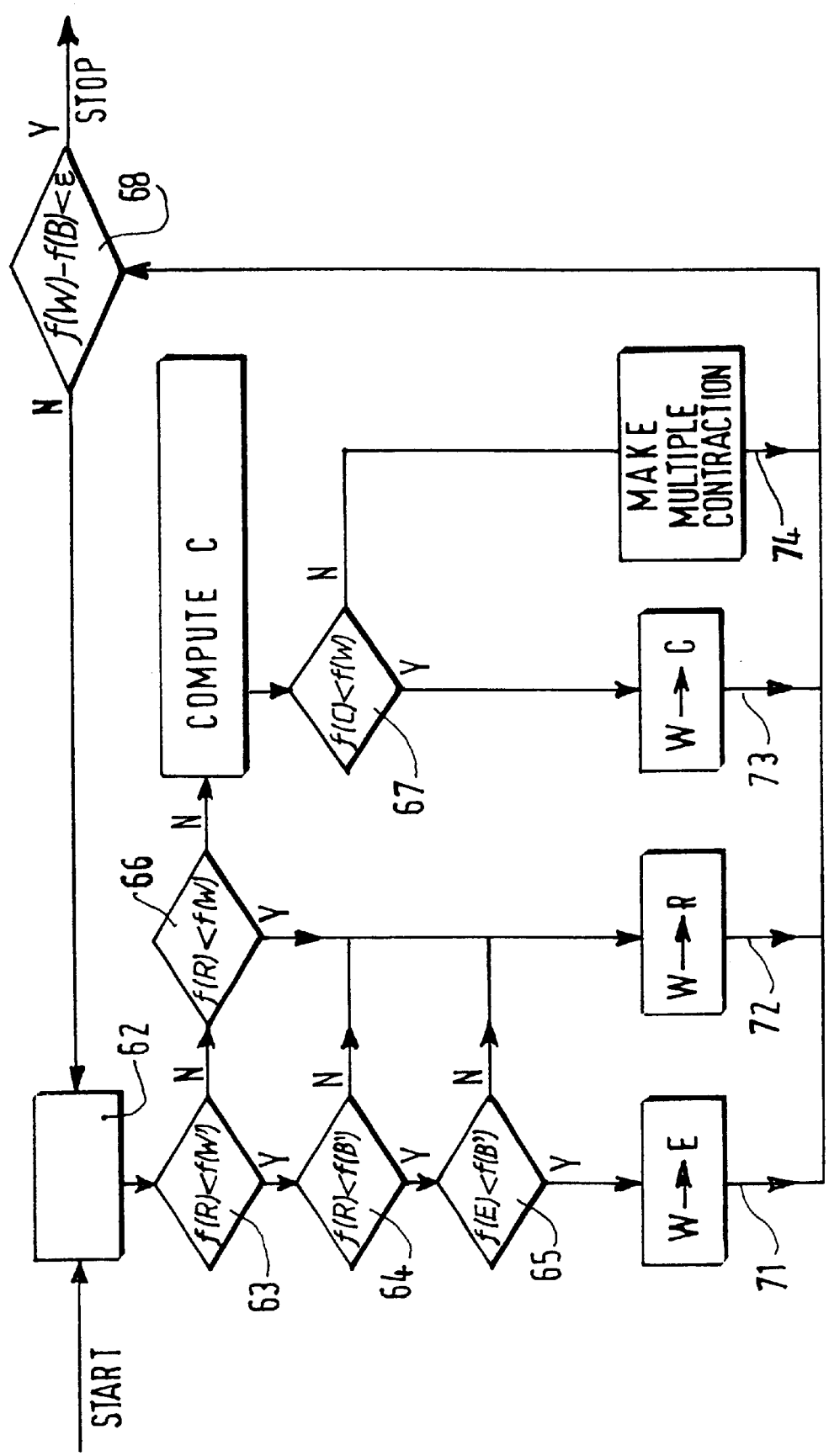
FIG. 7 shows a flowchart illustrating the downhill simplex algorithm used for the parallelism cost function.

The used complete algorithm is illustrated thanks to the flowchart given in FIG. 7. After initialization (START operation) and ranking by function value (step 62), tests (f(.)<f(.)?) 63, 64, 65, 66, 67, 68 are carried out:
1) f(R)<f(W')?
    a) if yes (Y), f(R)<f(B')?
        i) if yes (Y), f(E)<f(B')?
            if yes (Y), replace W by E (output 71);
            if no (N), replace W by R (output 72);
        ii) if no (N), replace W by R;
    b) if no (N), f(R)<f(W)?
        i) if yes (Y), replace W by R;
        ii) if no (N), C is defined (COMPUTE C) by the expression (34):

$$C = \arg \min [f(x)] \text{ pour } x \in \{C^{(+)}, C^{(-)}\} \quad (34)$$

and a further test is carried out:
2) f(C)<f(W)?
    (a) if yes (Y), replace W by C (output 73)
    (b) if no (N), make multiple contraction (output 74);
3) after the outputs 71 to 74, f(W)–f(B)<$\epsilon$?
    if no (N), feedback connection towards the step 62;
    if yes (Y), end of the algorithm (STOP).
with the following notations:
    $f = R^N \rightarrow R$, the function to minimize (here a parallelism function);

W, $C^{(-)}$, $C^{(+)}$, R, E, the N-dimensions points ($C^{(-)}$=negative contraction, $C^{(+)}$=positive contraction, R=reflection, E=expansion, as illustrated in FIG. 6, right part)

W', B, B' the antecedents of the second worst, the best and the second best values of f (then f(B)<f(B')< . . . <f(W')<f(W));

The possible destination points are computed as given by:

$$\begin{cases} R = 2M - W \\ E = M + \gamma(M - W) \\ C^{(+)} = M + \beta^{+}(M - W) \\ C^{(-)} = M - \beta^{-}(M - W) \end{cases}$$

Since their influence on the optimization performances is difficult to handle, the coefficients have been set to their simplest value, i.e.: $\gamma=2$, $\beta^{(-)}=0,5$.

What is claimed is:

1. A camera motion parameters estimation method provided for considering a sequence of successive video frames subdivided into blocks and processing this sequence, wherein said processing operation comprises the successive steps of:

extracting from said video sequence vectors corresponding to the motion between two successive frames, said motion vectors forming the camera velocity field;

preprocessing the camera velocity field, in order to reduce the amount of data and the heterogeneousness of said extracted motion vectors;

estimating for each pair of frames, from said preprocessed field, camera features between the two considered frames;

undertaking on the basis of said estimation a long term motion analysis to obtain motion descriptors corresponding to the estimated camera motion parameters;

wherein said preprocessing sub-step includes the computing operation of a vector representing the motion of a new block according to the motion vectors of the four original blocks and of an associated confidence level;

wherein said confidence level is given by the distance from each vector to its neighbourhood;

wherein said neighbourhood is represented by a value $\vec{V}(m)$ such as the mean value or the median, leading for the confidence mask to a value $C_{i,j}$ having an expression of the type:

$$C_{i,j} = e^{-\|\vec{V}_{i,j} - \vec{V}(m)\|^2}$$

where (i,j) defines the original block and $\vec{V}_{i,j}$ its original motion vector.

2. A method according to claim 1, wherein said preprocessing step comprises, in order to reduce the amount of vectors, the sub-steps of:

downsampling said original velocity field of motion vectors;

simultanously, rejecting the vectors that are not consistent according to the global information.

* * * * *